(12) United States Patent
Bunker et al.

(10) Patent No.: US 8,037,145 B2
(45) Date of Patent: Oct. 11, 2011

(54) SYSTEM AND METHOD FOR DETECTING EMAIL CONTENT CONTAINMENT

(75) Inventors: Guy Barry Owen Bunker, Farnham Common (GB); Tsuen Wan Ngan, Los Angeles, CA (US)

(73) Assignee: Symantec Operating Corporation, Mountain View, CA (US)

( * ) Notice: Subject to any disclaimer, the term of this patent is extended or adjusted under 35 U.S.C. 154(b) by 397 days.

(21) Appl. No.: 12/059,176

(22) Filed: Mar. 31, 2008

(65) Prior Publication Data

US 2009/0089539 A1 Apr. 2, 2009

Related U.S. Application Data

(60) Provisional application No. 60/976,456, filed on Sep. 30, 2007.

(51) Int. Cl.
*G06F 15/16* (2006.01)
(52) U.S. Cl. ........................................... 709/206
(58) Field of Classification Search ............ 709/206
See application file for complete search history.

(56) References Cited

U.S. PATENT DOCUMENTS

| | | | |
|---|---|---|---|
| 5,999,932 A | 12/1999 | Paul | |
| 6,052,709 A | 4/2000 | Paul | |
| 6,487,644 B1 | 11/2002 | Huebsch et al. | |
| 6,654,787 B1 | 11/2003 | Aronson et al. | |
| 7,644,127 B2 * | 1/2010 | Yu | 709/206 |
| 7,702,683 B1 * | 4/2010 | Kirshenbaum | 707/758 |
| 7,730,113 B1 * | 6/2010 | Payette et al. | 707/821 |
| 2004/0064737 A1 | 4/2004 | Milliken | |
| 2005/0081059 A1 * | 4/2005 | Bandini et al. | 713/201 |
| 2005/0086520 A1 | 4/2005 | Dharmapurikar | |
| 2005/0108339 A1 | 5/2005 | Gleeson et al. | |
| 2005/0108340 A1 | 5/2005 | Gleeson et al. | |
| 2005/0132197 A1 | 6/2005 | Medlar | |
| 2006/0041590 A1 | 2/2006 | King | |
| 2006/0190493 A1 * | 8/2006 | Kawai et al. | 707/104.1 |
| 2006/0288076 A1 | 12/2006 | Cowings et al. | |

(Continued)

FOREIGN PATENT DOCUMENTS

GB 2400933 10/2004

OTHER PUBLICATIONS

U.S. Appl. No. 10/117,065, entitled "Apparatus and Method for Weighted and Aging Spam Filtering Rules", by Paul, et al., filed Apr. 4, 2002.

(Continued)

*Primary Examiner* — Andrew Caldwell
*Assistant Examiner* — Lin Liu
(74) *Attorney, Agent, or Firm* — Meyertons, Hood, Kivlin, Kowert & Goetzel, P.C.

(57) ABSTRACT

Systems and methods for detecting email content containment are disclosed. In one embodiment, a method comprises generating a first set of hash values corresponding to a first email document, wherein the first set includes a respective hash value corresponding to each of a plurality of character sequences of the first email document. The method further comprises generating a second set of hash values corresponding to a second email document, wherein the second set include a respective hash value corresponding to each of a plurality of character sequences of the second email document, and determining whether the first set of hash values is a subset of the second set of hash values.

17 Claims, 7 Drawing Sheets

U.S. PATENT DOCUMENTS

2007/0115986 A1\* 5/2007 Shankara ............... 370/392
2008/0059590 A1 3/2008 Sarafijanovic

OTHER PUBLICATIONS

U.S. Appl. No. 10/871,583, entitled "System and Method for Filtering Spam Message Utilizing URL Filtering Module", by Cowings, et al., filed Jun. 17, 2004.

U.S. Appl. No. 10/949,465, entitled "System and Method for Filtering Fraudulent Messages", by Bruno, et al., filed Sep. 24, 2004.

U.S. Appl. No. 11/048,958, entitled "Method and Apparatus for Determining the Source of an Email Message", by Mantel, filed May 11, 2005.

U.S. Appl. No. 11/116,572, entitled "Method and Apparatus for Creating Aggressive Anti-Spam Rules", by Cowings, et al., filed Mar. 27, 2005.

U.S. Appl. No. 11/127,813, entitled "Method and Apparatus for Simulating End User Responses to Spam Email Messages", by Khalsa, et al., filed Feb. 1, 2005.

U.S. Appl. No. 11/127,814, entitled "Method and Apparatus for Detecting Spam in Email Messages and Email Attachments", by Cowings, et al., filed May 11, 2005.

JupiterOnlineMedia "What is message digest?—A Word Definition From the Webopedia Computer Dictionary", dated Mar. 12, 2002, downloaded from the Internet "http://www.webopedia.com/TERM/M/message_digest.html" on Sep. 28, 2007, 4 pages.

Yang, H. and Callan, J. "Near-duplicate detection for eRulemaking" Proceedings of the 2005 National Conference on Digital Government Research (Atlanta, Georgia, May 15-18, 2005), ACM International Conference Proceeding Series, vol. 89. Digital Government Society of North America, pp. 78-86.

Nevin Heintze, "Scalable document fingerprinting", Proceeding of the 1996 USENIX Workshop on Electronic Commerce, 1996.

Broder, et al "Syntactic clustering of the Web", Selected papers from the sixth international conference on World Wide Web, p. 1157-1166, Sep. 1997, Santa Clara, California, United States.

Schleimer, et al. "Winnowing: local algorithms for document fingerprinting", Proceedings of the 2003 ACM SIGMOD international conference on Management of data, Jun. 9-12, 2003, San Diego, California.

U.S. Appl. No. 12/142,546, entitled "Methods for Efficiently Finding Email Inclusions" by Johnny Ngan, filed Jun. 19, 2008.

U.S. Appl. No. 12/059,148, entitled "System and Method for Detecting Content Similarity Within Email Documents by Sparse Subset Hashing"by Tsuen Wan Ngan, filed Mar. 31, 2008.

U.S. Appl. No. 12/059,130, entitled System and Method for Detecting Content Similarity Within Emails Documents Employing Selective Truncation, by Tsuen Wan Ngan, filed Mar. 31, 2008.

U.S. Appl. No. 11/157,327, entitled "Method and Apparatus to Group Spam Email Messages" by Sanford Jensen, filed Jun. 20, 2005.

European Search Report dated Aug. 13, 2009 for EP Application No. EP09156526.

Wikipedia "Bloom Filter" downloaded from the Internet: URL: http://en.wikipedia.org/wiki/Bloom_filter> retrieved on Jul. 31, 2009.

\* cited by examiner

From: Jane     To: John

Subject: Fox

The quick brown fox jumped over the lazy dog.

The dog was sleeping.

301A

From: John     To: Jane

Subject: Re: Fox

[ The quick brown fox jumped over the lazy dog.

The dog was sleeping. ]

The fox was cunning.

The quick brown fox jumped over the lazy dog.

The dog was sleeping.     301A

The quick brown fox jumped over the lazy dog.

The dog was sleeping.

The fox was cunning.

The quick brown fox
jumped over the lazy dog

Computed hash value = 464

501A

The dog was sleeping

Computed hash value = 189

501B

} From Email Document 301A

The quick brown fox
jumped over the lazy dog

Computed hash value = 464

501C

The dog was sleeping

Computed hash value = 189

501D

The fox was cunning

Computed hash value = 203

501E

} From Email Document 301B

*FIG. 5*

SYSTEM AND METHOD FOR DETECTING EMAIL CONTENT CONTAINMENT

This application claims priority to U.S. provisional patent application Ser. No. 60/976,456, entitled "System And Method For Detecting Email Content Similarity Using Bloom Filtering Techniques", filed Sep. 30, 2007.

BACKGROUND OF THE INVENTION

1. Field of the Invention

This invention relates to email systems, and more particularly to the detection of content containment within email documents.

2. Description of the Related Art

Frequently, it is desired to efficiently find similar emails located in a database. For example, in litigation e-discovery situations, extensive databases of emails must be searched to decide whether emails are important to a legal case. Searching through an extensive database and comparing emails to determine potentially similar ones can be a problematic and tedious process. One approach for comparing emails for similarity is to compute a hash value from the content of differing emails and then compare the hash values for equality. Unfortunately, such approaches would typically only identify emails that are exact duplicates, since any differences in the emails would typically result in the generation of different hash values. Another possible approach is to compare every word of an email against the words of another to determine similarity. However, such an approach is typically very computationally intensive.

Often, emails may be near duplicates because an email is forwarded or replied to without much added text. When an initial email is repetitively replied to and/or forwarded, it may be desirable to find only the last email in the chain, since the last email often contains all of the content of the preceding emails. Thus, in e-discovery situations, it may be more desirable to find a last email in a chain of responsive emails so that a minimum number of emails can be reviewed without missing any information.

SUMMARY

Systems and methods for detecting email content containment are disclosed. In one embodiment, a method comprises generating a first set of hash values corresponding to a first email document, wherein the first set includes a respective hash value corresponding to each of a plurality of character sequences of the first email document. The method further comprises generating a second set of hash values corresponding to a second email document, wherein the second set include a respective hash value corresponding to each of a plurality of character sequences of the second email document. The method finally comprises determining whether the first set of hash values is a subset of the second set of hash values.

In some embodiments, the method may further comprise generating a first bloom filter representing the first set of hash values corresponding to the first email document, generating a second bloom filter representing the second set of hash values corresponding to the second email document, and comparing the first bloom filter with the second bloom filter. The first and second bloom filters may be compared by performing a bitwise OR operation. In various embodiments, the method further comprises providing an indication of whether content of the first email document is contained within the second email document based on a result of the determining.

BRIEF DESCRIPTION OF THE DRAWINGS

FIG. 3 depicts content of two exemplary emails.

FIG. 4 depicts the two exemplary emails with extraneous content removed.

FIG. 5 depicts an exemplary hash.

Figure 1:
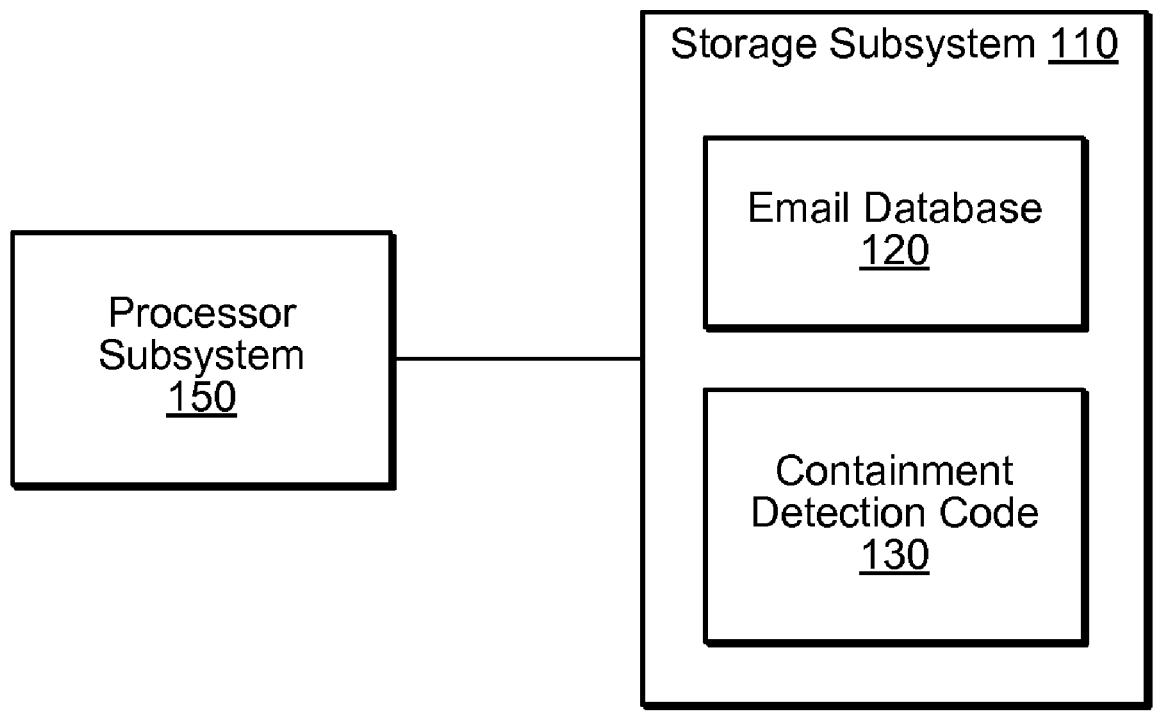
FIG. 1 is a block diagram of a computer system including an email database and containment detection code.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a computer system 100 is shown. Computer system 100 includes a storage subsystem 110 coupled to a processor subsystem 150. Storage subsystem 110 is shown storing an email database 120 and containment detection code 130. Computer system 100 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 100 may also be any type of networked peripheral device such as storage devices, switches, modems, routers, etc. Although a single computer system 100 is shown in FIG. 1, system 100 may also be implemented as two or more computer systems operating together.

Processor subsystem 150 is representative of one or more processors capable of executing containment detection code 130. Various specific types of processors may be employed, such as, for example, an x86 processor, a Power PC processor, an IBM Cell processor, or an ARM processor.

Storage subsystem 110 is representative of various types of storage media, also referred to as "computer readable storage media." Storage subsystem 110 may be implemented using any suitable media type and/or storage architecture. For example, storage subsystem 110 may be implemented using storage media such as hard disk storage, floppy disk storage, removable disk storage, flash memory, semiconductor memory such as random access memory or read only memory, etc. It is noted that storage subsystem 110 may be implemented at a single location or may be distributed (e.g., in a SAN configuration).

Email database 120 contains a plurality of email messages, each referred to herein as an email document, associated with one or more email system users. It is noted that various email documents within email database 120 may be duplicates of one another or may contain substantially similar content to that of other emails in the database (e.g., an initial email and a corresponding response email containing the initial email).

As will be described in further detail below, containment detection code 130 includes instructions executable by processor subsystem 150 to identify whether content of one email document in database 120 is contained (or potentially contained) within another email document. In various embodiments, email documents identified by containment detection code 130 as potentially being contained or containing the content of other emails may be reported to a user (e.g., a last email in a chain of responsive emails). In some embodiments, identified emails may be further evaluated. For example, upon identification, email documents may be analyzed or compared by additional code to determine and/or verify the extent to which content of one email is contained within another, and/or to identify chains of emails. Execution of containment detection code 130 may allow efficient filtering of email documents that do not contain content within other email documents.

Figure 2:
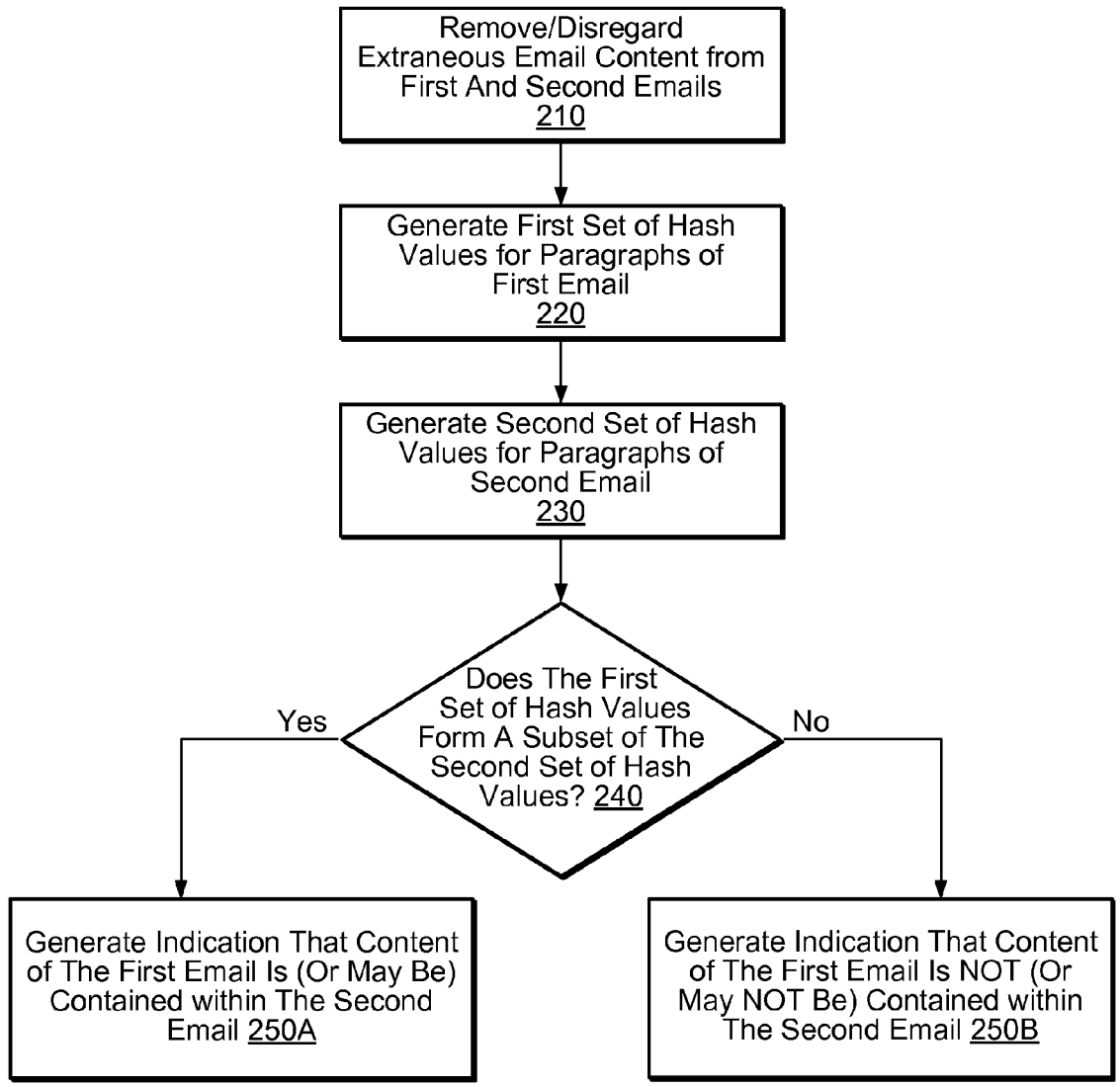
FIG. 2 is a flowchart of one embodiment of a method to detect content containment within email documents.

FIG. 2 is a flow diagram illustrating operations that may be carried out in accordance with execution of one embodiment of containment detection code 130. Operations illustrated in FIG. 2 will be discussed in conjunction with an exemplary situation illustrated by FIG. 3, which shows content of two possible email documents 301A and 301B. As shown, email document 301B is a response to email document 301A. In this example, it is noted that the email documents 301A and 301B contain different email headers (e.g., the From, To, and Subject portions). It is also noted that an ending portion of email document 301B contains the sequence "The fox was cunning", which is not included in email document 301A.

In step 210, extraneous email content in an email document being processed is removed or disregarded. This extraneous content may include common, reoccurring phrases found in typical email documents such as, "From [Name], To [Name], Subject [TITLE], On [DATE], at [TIME], [NAME] wrote:", "Begin forwarded message:", "- - - Original Message - - -", etc. An example of a result from this step is depicted in FIG. 4, where the headers have been removed from email documents 301A and 301B. In various embodiments, the extraneous email content removed/disregarded from each email document during step 210 may be predetermined or pre-selected words or phrases (e.g., phrases generally common to email documents). In other embodiments, the extraneous email content that is removed/disregarded may be controlled or specified by input from a user. It is noted that in some embodiments step 210 may be omitted.

A first set of hash values is then generated, in step 220, for each paragraph in the first email document being processed, and a second set of hash values is generated, in step 230, for each paragraph in the second email document being processed. FIG. 5 illustrates such an example in which the hash values 501A-E are generated for the paragraphs "The quick brown fox jumped over the lazy dog", "The dog was sleeping", and "The fox was cunning". In this particular embodiment, the alphabetic positions of each character in a paragraph are summed to generate each hash value. For example, the character "T" is the 20$^{th}$ letter in the alphabet and the character "h" is the 8$^{th}$ letter. Thus, a hash value of "464" is generated based on the sum of the alphabetic positions of the characters in the paragraph "The quick brown fox jumped over the lazy dog." The hash values "189" and "203" are similarly calculated based on the respective paragraphs "The dog was sleeping" and "The fox was cunning".

It is noted that any of a variety of other hash functions may be used to compute the hash value for a particular paragraph. Generally speaking, a "hash function" is any function that has a mapping of an input to a number (i.e., hash value). Thus, in various embodiments, specific hashing algorithms such as an MD5 hash, a SHA-1 hash, etc may be used. In the illustrated example, the input to the hash function may include the characters forming the paragraph or values representing the characters such as the ASCII ordinal values of the characters or the alphabetic character positions of the characters within each paragraph. Characters such as punctuation symbols, and/or numbers may or may not be included as input to the hash function, depending upon the embodiment.

It is also noted that in some embodiments, multiple hash values may be generated for each paragraph using different hash functions. In addition, it is noted that in some alternative embodiments, hash values may be computed for character sequences other than paragraphs, such as, for example, sentences, portions of paragraphs, or any other variations for grouping characters.

In step 240, the first set of hash values generated in step 220 and the second set of hash values generated in step 230 are compared to determine whether the first set of hash values forms a subset of the second set of hash values. If the first set forms a subset of the second set, containment detection code 130 may provide an indication in step 250A that content of the first email is contained (or is possibly contained) within the second email. Conversely, if the first set is not a subset of the second set, containment detection code 130 may provide an indication in step 250B that the content of the first email is not contained (or possibly not contained) within the content of the second email. As shown in FIG. 5, the hash values "464" and "189" are generated from the respective paragraphs "The quick brown fox jumped over the lazy dog" and "The dog was sleeping" in email document 301A. Because these paragraphs of email document 301A are also contained within the content of email documents 301B, the hash values "464" and "189" are also generated for email document 301B. On the other hand, "The fox was cunning" is only contained within the email document 301B, and thus, the hash value "203" is only generated for email document 301B. Since the set of hash values "464" and "189" corresponding to email document 301A forms a smaller subset of the set of hash values "464", "189" and "203" corresponding to email document 301B, containment detection code 130 may provide an indication that the content of email document 301A is contained within email document 301B. As used herein, the first set of hash values generated for the first email document forms a smaller subset of the second email document if the second set includes each hash value included in the first set as well as additional hash values generated from paragraphs not contained in the first email document. In some embodiments, containment detection code 130 may also provide an indication of content containment in step 250A if the first set is the same as the second set (i.e., the sets include the same hash values).

By iteratively comparing different pairs of email documents, chains of responsive emails can be identified by determining emails that have content contained within other emails. When it is determined that one email contains the content of all others in the chain, it may be inferred that this email is a last in the chain. For example, in FIG. 5, email documents 301A and 301 B are in the same chain of responsive emails, and email document 301B is the last email. In some embodiments, containment detection code 130 may be configured to determine that a particular email contains the content of several others, and to provide an indication that the particular email may be the last in a chain.

It is noted that multiple unrelated emails may, occasionally, contain content that results in a false indication that the content one email document is contained (or potentially) contained within another (e.g., commonly recurring paragraphs). Thus, in various embodiments, during step 240, containment detection code 130 may be programmable to disregard certain hash values corresponding to content that appears in multiple unrelated emails.

Figure 6:
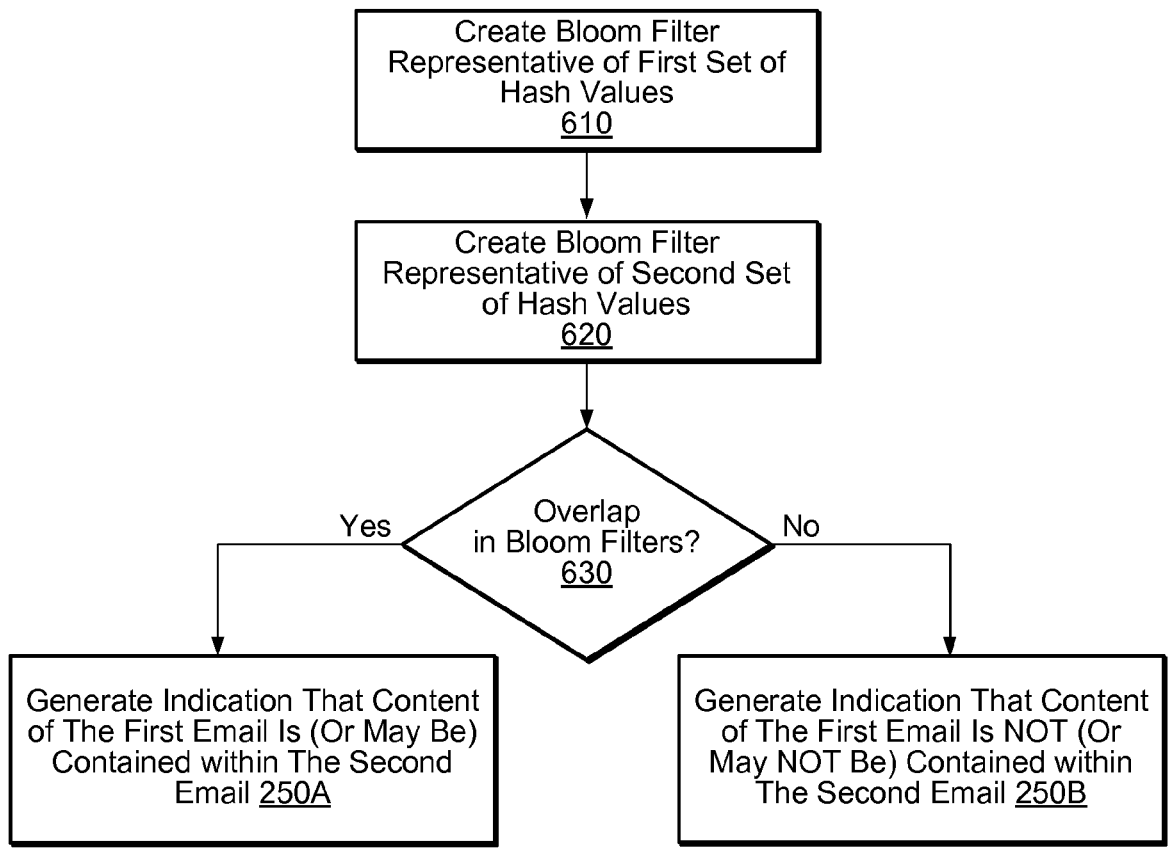
FIG. 6 is a flowchart of one embodiment of a method for comparing hash values using bloom-filtering techniques.

FIG. 6 is a flow diagram illustrating one particular implementation of step 240 for determining whether one set of hash values forms a smaller subset of another set. Accordingly, the following actions may be performed in conjunction with the techniques described above.

In the step 610, the first set of hash values generated in step 220 are reflected in a bloom filter corresponding to the first email document. Generally speaking, a "bloom filter" is a data structure in the form of a bit vector that represents a set of elements and is used to test if an element is a member of the set. Initially, an empty bloom filter may be characterized as a bit array of zeros. As elements are added to the bloom filter, corresponding, representative bits may be set.

Figure 7:
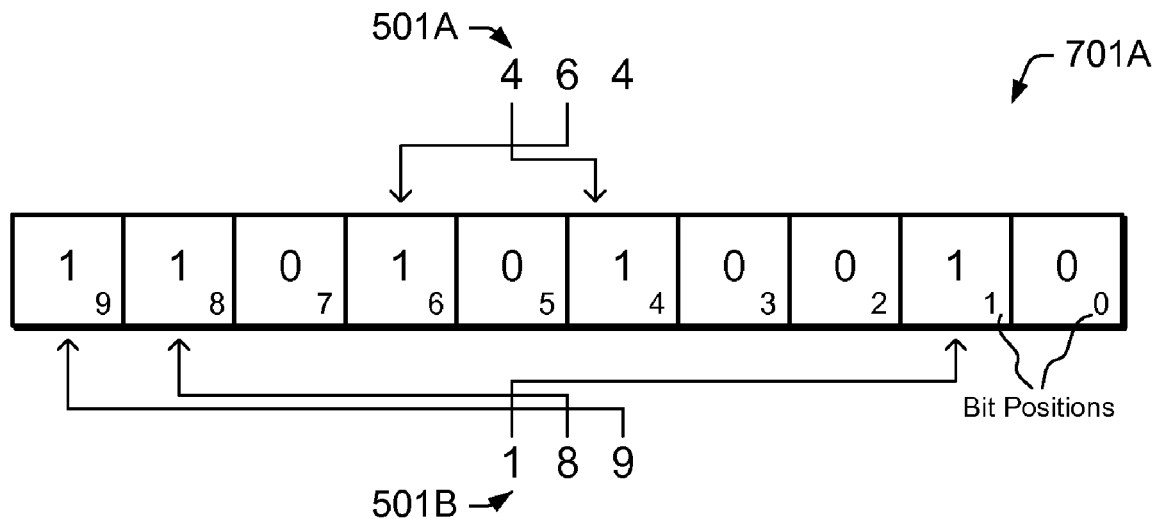
FIG. 7 depicts exemplary bloom filters.
Figure 7:
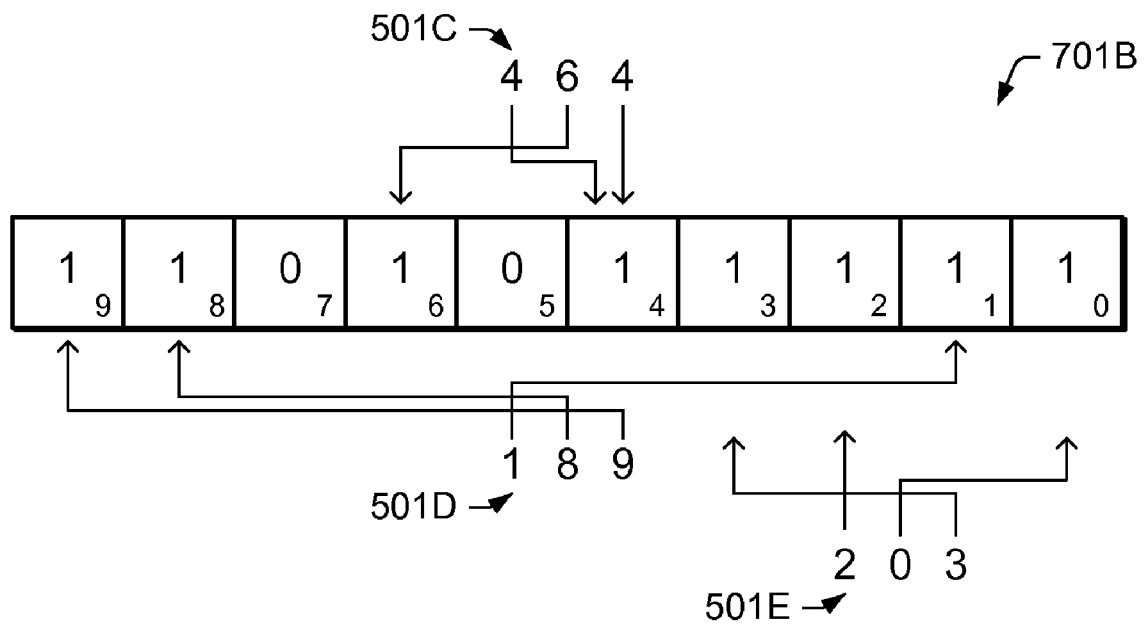

Thus, as illustrated in FIG. 7, the computed hash values 501A of "464" and 501B of "189" corresponding to the paragraphs from email document 301A are reflected in bloom filter 701A by setting selected bits. In particular, for the specific bloom-filtering algorithm illustrated in this example, bit positions 4 and 6 of bloom filter 601A are set based on the digits forming the computed hash value "464", and bits corresponding to positions 1, 8, and 9 are similarly set for hash value "189". In step 620, as shown, the computed hash values generated in step 230, corresponding to the paragraphs from the second email document 301B, are reflected in bloom filter 701B by similarly setting selected bits.

It is noted that any variety of other bloom-filtering algorithms may be employed in other embodiments. For example, the size of the vector (i.e. number of bits) forming the bloom filter data structure may be significantly larger than that illustrated in FIG. 7, and a given hash value may be represented in the bloom filter by setting other specific bit positions, as dictated by the algorithm.

In step 630, the bloom filters generated in steps 610 and 620 are compared to determine an extent of overlap. As shown in FIG. 6, the computed hash values "464" and "189" are represented in both bloom filters 701A and 701B, and thus, bits at positions 1, 4, 6, 8 and 9 in bloom filters 701A and 701B are correspondingly set. On the other hand, hash value "203" is only represented in bloom filter 701B, and thus, bits at positions 2, 0, and 3 are not correspondingly set in bloom filter 701A.

Figure 8:
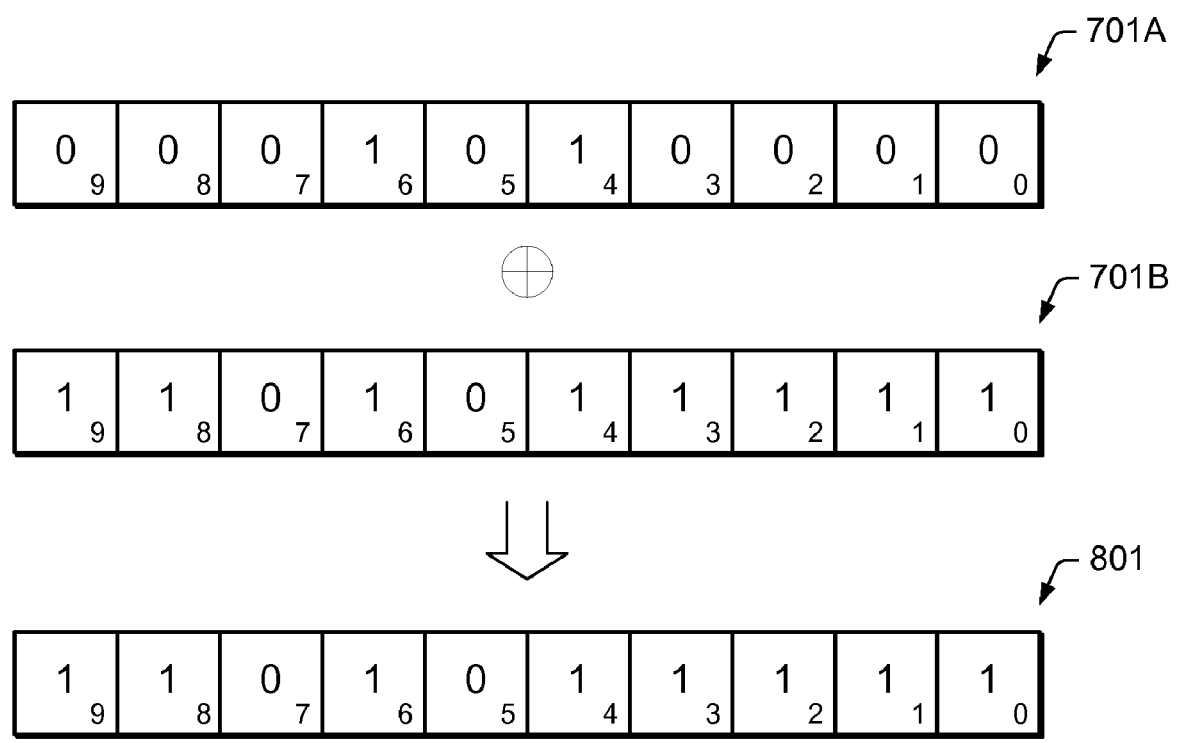
FIG. 8 depicts an exemplary bitwise OR comparison of bloom filters.

In one particular embodiment depicted in FIG. 8, a bitwise OR may be performed to compare the bloom filters of two email documents. In this example, bit vector 801 is generated from the bitwise OR between the bit vectors of bloom filters 701A and 701B, and is subsequently compared with each of the bloom filters 701A and 701B. If the resultant bit vector 801 of the bitwise OR matches either of the input bloom filters 701A or 701B, containment detection code 130 may provide an indication that the content of one email is contained (or potentially contained) within the content of the other email in step 250A. Conversely, if the resultant bit vector 801 of the bitwise operation does not match either of bloom filters 701A and 701B, containment detection code 130 may provide an indication that the content of either email is not contained (or possibly not contained) within the other in step 250B. In the particular example illustrated by FIG. 8, it is noted that bit vector 801 does match bloom filter 701B, and thus, containment detection code 130 provides an indication that the content of email document 301A is contained within the content of email document 301B.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    receiving an input from a user, wherein the user identifies content common to a plurality of email documents and specifies that the common content is to be disregarded;
    generating a first set of hash values corresponding to a first email document, wherein the first set includes a respective hash value corresponding to each of a plurality of character sequences of the first email document, and wherein the generating of the first set of hash values disregards any of the common content present in the first email document;
    generating a first bloom filter representing the first set of hash values corresponding to the first email document, wherein generating the first bloom filter includes setting one or more bits corresponding to and dependent on each hash value in the first set of hash values;
    generating a second set of hash values corresponding to a second email document, wherein the second set includes a respective hash value corresponding to each of a plurality of character sequences of the second email document, and wherein the generating of the second set of hash values disregards any of the common content present in the second email document;
    generating a second bloom filter representing the second set of hash values corresponding to the second email document, wherein generating the second bloom filter includes setting one or more bits corresponding to and dependent on each hash value in the second set of hash values; and
    determining whether the first set of hash values forms a smaller subset of the second set of hash values, by comparing the first bloom filter with the second bloom filter.

2. The method of claim 1, wherein each of the plurality of character sequences of the first email document is a respective paragraph of the first email document, and wherein each of the plurality of character sequences of the second email document is a respective paragraph of the second email document.

3. The method of claim 1, wherein said determining includes performing a bitwise OR operation on the first and second bloom filters.

4. The method of claim 3, further comprising providing an indication of whether content of the first email document is contained within the second email document based on a result of said determining.

5. The method of claim 1, further comprising providing an indication of whether content of the first email document is contained within the second email document based on a result of said determining.

6. A non-transitory computer-readable memory medium storing program instructions that are computer-executable to:
receive an input from a user, wherein the user identifies content common to a plurality of email documents and specifies that the common content is to be disregarded;
generate a first set of hash values corresponding to a first email document, wherein the first set includes a respective hash value corresponding to each of a plurality of character sequences of the first email document, and wherein generating the first set of hash values disregards any of the common content present in the first email document;
generate a first bloom filter representing the first set of hash values corresponding to the first email document, wherein generating the first bloom filter includes setting one or more bits corresponding to and dependent on each hash value in the first set of hash values;
generate a second set of hash values corresponding to a second email document, wherein the second set includes a respective hash value corresponding to each of a plurality of character sequences of the second email document, and wherein generating the second set of hash values disregards any of the common content present in the second email document;
generate a second bloom filter representing the second set of hash values corresponding to the second email document, wherein generating the second bloom filter includes setting one or more bits corresponding to and dependent on each hash value in the second set of hash values; and
determine whether the first set of hash values forms a smaller subset of the second set of hash values, by comparing the first bloom filter with the second bloom filter.

7. The non-transitory computer-readable memory medium of claim 6, wherein each of the plurality of character sequences of the first email document is a respective paragraph of the first email document, and wherein each of the plurality of character sequences of the second email document is a respective paragraph of the second email document.

8. The non-transitory computer-readable memory medium of claim 6, wherein the program instructions are further computer-executable to provide an indication of whether content of the first email document is contained within the second email document based on comparing the first and second bloom filters.

9. The non-transitory computer-readable memory medium of claim 6, wherein the program instructions are computer-executable to compare the first and second bloom filters by performing a bitwise OR operation.

10. The non-transitory computer-readable memory medium of claim 6, wherein the program instructions are further computer-executable to disregard predetermined content of the first and second email documents.

11. The non-transitory computer-readable memory medium of claim 10, wherein the predetermined content includes email header information.

12. A system, comprising:
one or more processors
memory storing program instructions that are computer-executable by the one or more processors to:
receive an input from a user, wherein the user identifies content common to a plurality of email documents and specifies that the common content is to be disregarded;
generate a first set of hash values corresponding to a first email document, wherein the first set includes a respective hash value corresponding to each of a plurality of character sequences of the first email document, and wherein generating the first set of hash values disregards any of the common content present in the first email document;
generate a first bloom filter representing the first set of hash values corresponding to the first email document, wherein generating the first bloom filter includes setting one or more bits corresponding to and dependent on each hash value in the first set of hash values;
generate a second set of hash values corresponding to a second email document, wherein the second set includes a respective hash value corresponding to each of a plurality of character sequences of the second email document, and wherein generating the second set of hash values disregards any of the common content present in the second email document;
generate a second bloom filter representing the second set of hash values corresponding to the second email document, wherein generating the second bloom filter includes setting one or more bits corresponding to and dependent on each hash value in the second set of hash values; and
determine whether the first set of hash values forms a smaller subset of the second set of hash values, by comparing the first bloom filter with the second bloom filter.

13. The system of claim 12, wherein each of the plurality of character sequences of the first email document is a respective paragraph of the first email document, and wherein each of the plurality of character sequences of the second email document is a respective paragraph of the second email document.

14. The system of claim 12, wherein the program instructions are executable to compare the first and second bloom filters by performing a bitwise OR operation.

15. The system of claim 12, wherein the program instructions are further executable to disregard one or more hash values in the first or second sets when determining whether the first set of hash values forms a smaller subset of the second set of hash values.

16. The system of claim 12, wherein the program instructions are further executable to identify the second email document as a response to the first email document based on determining that the first set of hash values forms a smaller subset of the second set of hash values.

17. The system of claim 12, wherein one or more of the hash values of the first and second sets are generated using an MD5 or SHA-1 hashing algorithm.

* * * * *